No. 12,649. REISSUED MAY 14, 1907.
C. H. CAMPBELL.
PROCESS OF OBTAINING CONCENTRATED MILK CONTAINING CREAM.
APPLICATION FILED DEC. 14, 1905.
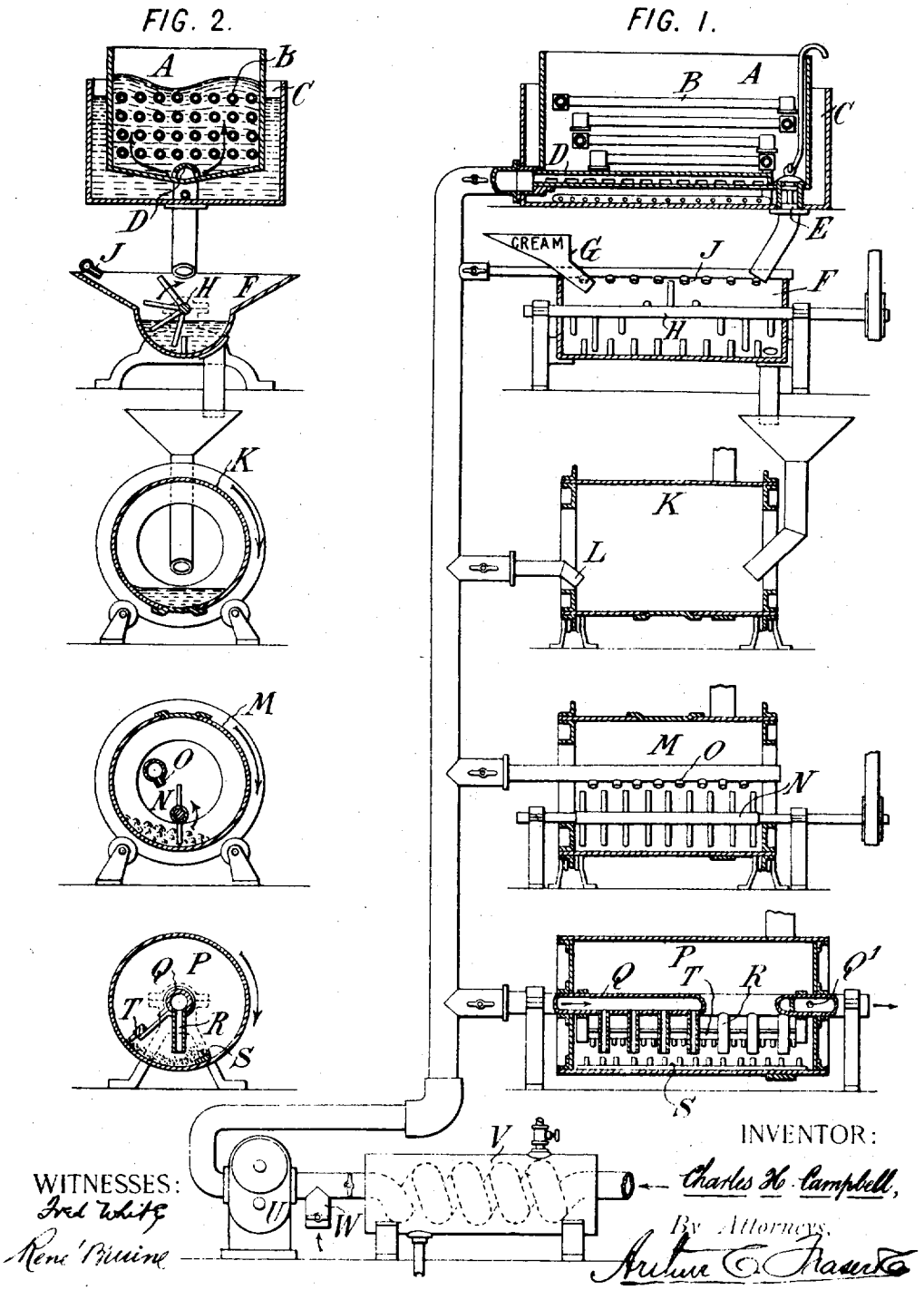
WITNESSES:
Fred White
René Bruine
INVENTOR:
Charles H. Campbell,
By Attorneys,
Arthur C. Fraser & Co.

UNITED STATES PATENT OFFICE.

CHARLES H. CAMPBELL, OF NEW YORK, N. Y., ASSIGNOR, BY MESNE ASSIGNMENTS, TO NATIONAL NUTRIENT COMPANY, OF JERSEY CITY, NEW JERSEY, A CORPORATION OF NEW JERSEY.

PROCESS OF OBTAINING CONCENTRATED MILK CONTAINING CREAM.

No. 12,649. Specification of Reissued Letters Patent. Reissued May 14, 1907.

Original No. 786,626, dated April 4, 1905. Application for reissue filed December 14, 1906. Serial No. 291,793.

*To all whom it may concern:*

Be it known that I, CHARLES H. CAMPBELL, a citizen of the United States, residing in the borough of Manhattan, city and State of New York, have invented a certain new and useful Process of Obtaining Concentrated Milk Containing Cream, of which the following is a specification.

My invention aims to provide a new process of obtaining a food product made largely or wholly from milk and in which cream, and preferably a definite proportion of cream, is obtained in the final product.

The product of my present application is a concentrated and preferably substantially desiccated milk having a flavor of cream induced by the presence of cream cultures. Where the product is of the consistency of ordinary "condensed" milk, it may have also the valuable quality that when water is added to restore it to its original density the cream will rise as in fresh milk. Preferably also the product contains not more than about enough cream to give twenty per cent. of butter-fat in the desiccated product. A convenient limit of the percentage of cream is such that the product shall not be excessively greasy and shall be so dry as to permit substantially complete desiccation and granulation to a desired fineness. If desired to grind or powder the product, it should not contain more than about ten per cent. of butter-fat. Preferably also the soluble and peptogenic (peptone-yielding under the action of pepsin) qualities of the proteids are substantially undiminished, which property, together with the desired flavor, gives the product the greatest value both as regards its nutritiveness and its pleasant taste.

The product of this improved process by the addition of water may be converted into fluid milk containing any desired ratio of cream or butter-fat to the total fluid product, or it may be eaten dry. If the process be stopped at a certain point before the fat globules of the cream have been broken up and the mass reduced to a stable emulsion, the reconstituted milk is so perfect that the cream will rise thereon as in fresh milk. It can be more readily and cheaply handled and transported than fresh milk, and it can also be preserved for a much longer time. Another advantage of this process is in the uniformity which it provides in the proportion of fatty to nonfatty solids, the product being superior in uniformity to milk taken at different times from even the same cow. Another advantage is that the proportion of cream may be varied to suit different purposes. For example, the product may be made as rich in cream as mother's milk or as cow's milk, or it may be made with a small percentage of cream sufficient for use in the manufacture of confections, chocolates, bakers' products, or other manufactured food products. Another advantage which the desiccated product possesses over fresh milk is in the intimacy and permanency of combination between the fatty and the nonfatty solids.

According to my inproved process the milk is concentrated and preferably substantially desiccated, and at the same time the cultures or bacteria in all or part of the cream are retained uninjured, and therefore serve to retain the flavor of cream in the final product. This may be accomplished by partially concentrating and preferably at the same time sterilizing milk, and mixing cream therewith (and preferably concentrating the mixture) without further sterilization, so that the bacteria of the added cream are not subjected to the action of the first part of the process.

My improved process, however, is not limited to such conditions as will produce the specific product above described, except where it is so stated in the claims hereinafter, but may include the partial concentration of milk, and the adding of cream, with or without the concentration and drying of the mixture. The process in either case produces a product containing both the fatty and the non-fatty solids of milk in any desired proportion and which is of considerable value.

The process is preferably carried out at so low a temperature as to retain the soluble and peptogenic qualities of the proteids and so rapidly as to avoid souring of the milk.

The general nature of the process of my invention and of a particular product which may be made thereby having been indicated, I will describe at length a particular process which is within the invention.

The process in so far as it relates to the manipulations performed on the material may utilize certain features of the processes described in Patents No. 668,161, to Joseph H. Campbell, and No. 668,162, to Joseph H. Campbell and myself, both dated February 10, 1901, but is distinguished therefrom in the nature of the ingredients used during different stages of the process, in the mixing of the cream with the partially-concentrated milk at a particular stage of the process, and in the details hereinafter referred to. Preferably the milk is first skimmed and then concentrated to any suitable degree. For example, the concentration may be continued until the skim-milk is reduced to a thick fluid—as, for example, one-fifth or one-sixth of its original volume. It is then still quite fluid, about as much so as ordinary commercial condensed milk. The concentration may be carried to a less or a greater degree than that stated. The less the degree of concentration the greater the facility of mixing in the cream, and the greater the degree of preliminary concentration the less the amount of subsequent concentration. The desired proportion of cream is then added. These steps of the process produce the concentrated product referred to having approximately the consistency of ordinary condensed milk, and constitute in themselves a complete process subsidiary to the main invention.

Where a desiccated product is to be produced the amount of cream added is preferably such as to make the final product not more than about twenty per cent. butter-fat. For the production of a well-flavored product the cream should be added without undergoing any preliminary treatment tending to injure the bacteria which give it its flavor. The non-fatty and the fatty ingredients are then thoroughly mixed, the condition of the mass permitting the mixing to be most intimate, so that the product shall be entirely homogeneous. After thoroughly mixing the ingredients the whole mass is further concentrated to dryness and substantially to the point of complete desiccation, or the drying may be going on simultaneously with the mixing.

Preferably the entire process is performed with the milk at a temperature below the coagulating-point of albumen, so as to preserve the soluble and peptogenic qualities of the proteids, and it is performed with such rapidity as to avoid souring of the milk. I may use a comparatively high temperature (within the coagulating-point referred to) during the first concentration, and this, together with the comparatively long period of treatment, tends to sterilize the first batch. In the subsequent concentration or drying a temperature below 120° and preferably in the neighborhood of 100° Fahrenheit should be maintained, this stage of the process being directed as far as possible to the preservation of the bacteria of the added cream, so as to secure the desired flavor described. It is noticed that a very small percentage of cream added to the substantially sterilized concentrated skim-milk produces a distinct flavor in the final product. This is probably due to the fact that the partially-concentrated skim-milk serves as a culture-bed or breeding-ground (especially at temperatures between 90° and 104° Fahrenheit) to permit the rapid multiplication of the flavor bacteria of the cream, the skim-milk being thus inoculated with the desired flavor.

An apparatus for carrying out the described process is shown more or less diagrammatically in the accompanying drawings, in which—

Figure 1 is a longitudinal and Fig. 2 a transverse section through the several elements of the apparatus.

The use of this apparatus is as follows: The skim-milk is put into a concentrating-tank A, where it is maintained at a desired evaporating temperature below the coagulating-point of albumen by means of hot water circulated through coils B and a jacket C, so as to partially vaporize it, exposing it at the same time to a blast of air through the perforated pipe D, the volume of air supplied depending upon the applied temperature and the desired temperature of the milk. The blast of air carries off the heated vapor produced by the applied heat and maintains the milk at a temperature below that of the applied heat. This difference in temperature in turn hastens the process, the external heat being continually taken up by the milk and carried off with a portion of the vapor by the blast of air. After concentrating the milk to the desired degree in the tank A, the valve E is opened to let the milk into a mixer or combined mixer and drier F, into which also the cream is conducted from a hopper G. The mixture should be allowed to stand here until cooled to below 120° Fahrenheit and preferably to about 100° Fahrenheit. The shaft H is rotated, and its arms stir and mix the product, being assisted in this function by the pins projecting inward from the lower wall of the vessel. The time spent in mixing the product in the mixer F may also be utilized in drying the same by providing a series of nozzles J at one side of the vessel, through which air is projected into the mass and upon the extended surfaces exposed by the rotating arms on the shaft H, this mode of operation being, in effect, identical with that carried on in the next vessel. But where no further concentration is desired, the blowing in of air in the mixer is dispensed with, and the only effect is to mix the cream with the concentrated milk without altering its consistency except in so far as the thicker or thinner cream thickens or thins the mass.

For making a desiccated product the mixer F and the operations carried on therein may be omitted entirely, a sufficient mixing of the mass occurring in the hereinafter-described drier and simultaneously with the drying of the mass therein. When the mixer F has been used, however, the product is led therefrom into a drum K, into which heated air is projected through a nozzle L, the drum being slowly rotated, so as to expose an extended surface of the product to the desiccating action of the air. The operation in this drum is continued until the mass coats the wall of the cylinder thickly and is of a doughy or putty-like consistency, so that the continuation of the operation would give but slow results. It is then scraped from the walls of the vessel and is broken into small lumps, being subdivided again and again in any suitable apparatus and simultaneously exposed to the desiccating action of air, preferably heated. An apparatus suitable for this purpose is shown at M, which is a drum substantially identical with the drum K and in which is a revolving shaft N, having a number of arms which break up and continually stir the material, while the rotation of the drum continually exposes a fresh surface of the material therein to the action of air blown thereon through a series of nozzles O. When the product has reached a certain degree of dryness and smallness of the lumps, the shaft N may be removed and the operation continued in the drum M, or the material may be returned to the drum K for further treatment to bring it to a substantially complete desiccation, or the product may be conducted from the drum M to a drum P, which rotates about a hollow shaft Q, projecting from which are nozzles R, conducting hot air to the mass now in the condition of small lumps or grains. As the cylinder revolves, a cleat S, running lengthwise of the cylinder and carrying pins, lifts the material up toward the side, after which it falls again to the bottom, the stirring and mixing of the same being assisted by a bar T, upon which are pins staggered in relation to the pins on the cleat S, the bar T being attached to the stationary shaft Q. The operation here will ordinarily be carried on until the particles are reduced to granules approximately the size of ordinary cornmeal. It may then, if containing ten per cent. or less of fat, be further ground to any desired degree of fineness. The shaft Q is provided near one end with a diaphragm which separates the outlet end from the inlet portion, and the outlet end is provided with apertures Q′, through which the air escapes, as indicated by the arrow.

U is a pressure-blower for supplying air to the several vessels, a heater being shown at V for heating the air and a branch pipe W for obtaining a supply of unheated air.

I may, if desired, use sterilized air in carrying out the first stage of my process. In such case the milk during the first or concentrating stage of the process may be, and preferably is, rendered entirely sterile, and when the cream has been added the mixture will contain only the bacteria of the cream, these being the bacteria which are desirable in order to obtain the flavor of the cream in the final product. The final product, though apparently dry, may still contain from eight to ten per cent. of water. In this condition the bacteria are in a potentially-active state, though further bacterial action is inhibited, so that the product will keep for an indefinitely long time.

Instead of adding cream to the partly-concentrated milk, I may obtain the desired flavor in the final product by separating out from the cream the particular bacteria which gives it its attractive flavor and by adding this bacteria to the milk. Such addition may take place after any degree of partial concentration, it being only necessary that the subsequent treatment shall not be such as to seriously injure the added bacteria. Such bacteria are now well-known manufactured products. For example, I might secure a good butter culture or even a good cheese culture and introduce it in the manner described. In this way I have been able to secure a product having a very pleasant Roquefort cheese flavor.

It is not essential to the invention that skim-milk shall be used. The milk used in the first stage of the process may contain a certain amount of cream, if desired, considerably above the amount contained in ordinary skim-milk.

If the final product be found drier than desirable, it may be enriched by the addition of cream, butter, or any desired oily matter.

In so far as the broad invention is concerned, the first part of the process is not necessarily carried out in the manner described. Any suitable concentrator and concentrating process may be employed during this stage—such, for example, as the well-known vacuum process.

The invention includes not only the complete detailed process described, but the novel sub-process forming a part thereof and consisting in concentrating milk from which all or a substantial portion of the cream has been separated, and after the concentration restoring cream in the desired proportion, with or without subsequent concentration or dessication; thus differing from the process described in my Patent No. 668,161, for making a concentrated milk containing cream, in that the latter process subjects the cream to the same treatment as the milk, converting the mass into practically an emulsion, while the present process introduces the cream without physical change from its original form, that is, in large globules which remain suspended in the concentrated milk, but rise gradually to the top when it is restored to the consistency of fresh milk just as does the cream in fresh milk. Such a process results in a "condensed" or concentrated milk, which, by the addition of water, gives milk resembling fresh milk not merely in color, taste, and chemical analysis, as is the case with the dessicated milk when restored to liquid form, but also in physical peculiarities. Where the cream and milk are treated together, as explained, the mass is reduced to an emulsion, the cream being finely divided and held in position throughout the mass even when subsequently re-diluted to the specific gravity of fresh milk. The same is true of milk condensed by the ordinary vacuum process. The concentrated milk obtained from the mixer F, however, carries the cream not in a finely divided state, but in substantially the large globular condition in which it is found in fresh milk. Owing to the degree of concentration of the mass, such cream cannot separate, and the milk is stable and can be transported freely and kept for a long time. On restoring it to its original specific gravity, however, the globules of cream work their way upward through the comparatively thin and heavy milk, and collect on the top substantially as in fresh milk. Such a condensed milk is of great value, especially in those countries where rich fresh milk is rare.

Though I have described with great particularity of detail a process embodying my invention, yet I am not to be understood as limiting my invention to the specific process described. Many variations of the same are possible to those skilled in the art without departure from the invention. It is understood, also, that many variations may be made in the proportion of the ingredients or by the addition or substitution of ingredients known to those skilled in the art without departure from the invention.

What I claim, therefore, is—

1. The process of making a food product, which consists in partially concentrating skim-milk by applying heat thereto so as to partially vaporize the same, and exposing it at the same time to a blast of air in such volume as to carry off the heated vapor produced and to maintain the milk at a temperature below that of the applied heat, whereby the milk may be concentrated rapidly and at a low temperature, mixing cream with the partially-concentrated skim-milk, concentrating the mixture to a substantially solid condition by exposing extended surfaces thereof to the evaporating action of the air, and drying the mass by subdivision and exposure to air.

2. The process of making a food product, which consists in partially concentrating skim-milk by applying heat thereto so as to partially vaporize the same and exposing it at the same time to a blast of air in such volume as to carry off the heated vapor produced and to maintain the milk at a temperature below that of the applied heat, whereby the milk may be concentrated rapidly and at a low temperature, mixing cream with the partially-concentrated skim-milk, and concentrating and drying the mixture.

3. The process of making a food product, which consists in partially concentrating skim-milk by applying heat thereto so as to partially vaporize the same, and exposing it at the same time to a blast of air to carry off the heated vapor produced and to maintain the milk at a temperature below that of the applied heat, whereby the milk may be concentrated rapidly and at a low temperature, mixing cream with the partially-concentrated skim-milk, and concentrating and drying the mixture.

4. The process of making a food product, which consists in partially concentrating skim-milk by applying heat thereto so as to partially vaporize the same, and exposing it at the same time to a blast of air to carry off the heated vapor produced and to maintain the milk at a temperature below that of the applied heat, whereby the milk may be concentrated rapidly and at a low temperature, this concentration being continued until the mass is reduced to about one-sixth its original volume, mixing cream with the partially-concentrated skim-milk, and concentrating and drying the mixture.

5. The process of making a food product, which consists in partially concentrating skim-milk by applying heat thereto so as to partially vaporize the same and exposing it at the same time to a blast of air to carry off the heated vapor produced, and to maintain the milk at a temperature below that of the applied heat, whereby the milk may be concentrated rapidly and at a low temperature, mixing cream with the partially-concentrated skim-milk, and concentrating and drying the mixture at a temperature below approximately 120° Fahrenheit.

6. The process of making a food product, which consists in partially concentrating skim-milk by applying heat thereto so as to partially vaporize the same and exposing it at the same time to a blast of air in such volume as to carry off the heated vapor produced, and maintain the milk at a temperature below the coagulating-point of albumen, whereby the milk is concentrated so rapidly as to avoid souring and at such a low temperature as to preserve the soluble and peptogenic qualities of the proteids, mixing cream with the partially-concentrated skim-milk, and concentrating and drying the mixture.

7. The process of making a food product, which consists in concentrating milk to a thick fluid constituting a culture-bed suitable for cream bacteria, adding unsterilized cream to the partially-concentrated milk and mixing it intimately therewith so as to inoculate the same with the cream bacteria, and further concentrating and drying the mixture at such temperatures as to retain uninjured at least a portion of the bacteria in the cream so that further bacterial action is inhibited while the bacteria are retained in a potentially-active state and give a flavor of cream to the final product.

8. The process of making a food product, which consists in concentrating milk to a thick fluid constituting a culture-bed suitable for cream bacteria, adding unsterilized cream to the partially-concentrated milk and mixing it intimately therewith so as to inoculate the same with the cream bacteria, and further concentrating and drying the mixture at a temperature below the coagulating-point of albumen so that the soluble and peptogenic qualities of the proteids are substantially undiminished, the temperature being also such as to retain uninjured at least a portion of the bacteria in the cream so that further bacterial action is inhibited while the bacteria are retained in a potentially-active state and give a flavor of cream to the final product.

9. The process of making a food product, which consists in sterilizing and concentrating milk to a thick fluid constituting a culture-bed suitable for cream bacteria, adding unsterilized cream to the partially-concentrated sterilized milk and mixing it intimately therewith so as to inoculate the same with the cream bacteria, and further concentrating and drying the mixture at such temperatures as to retain uninjured at least a portion of the bacteria in the cream so that further bacterial action is inhibited while the bacteria are retained in a potentially-active state and give a flavor of cream to the final product.

10. In the process of making a concentrated food product, concentrating skim milk to a thick fluid having approximately one-sixth of its original volume by applying heat thereto so as to partially vaporize the same, and exposing it at the same time to a blast of air in such volume as to carry off the heated vapor produced and to maintain the milk at a temperature below that of the applied heat, whereby the milk may be concentrated rapidly and at a low temperature, and mixing cream with the concentrated skim-milk, until the mass is reduced to a stable emulsion and stopping the mixing before the fat globules are broken up.

11. In the process of making a concentrated food product, concentrating skim-milk to a thick fluid by heating it to a temperature below the coagulating point of albumen, so that the soluble and peptogenic qualities of the proteids are substantially undiminished, and mixing cream with the concentrated skim-milk, until the mass is reduced to a stable emulsion and stopping the mixing before the fat globules are broken up.

12. In the process of making a concentrated food product, concentrating milk to a thick fluid constituting a culture bed suitable for cream bacteria, and adding unsterilized cream to the partially concentrated milk and mixing it intimately therewith so as to inoculate the same with the cream bacteria, and further concentrating the mixture at such temperature as to retain uninjured at least a portion of the bacteria in the cream so that the bacteria produce a flavor of cream in the final product.

In witness whereof I have hereunto signed my name in the presence of two subscribing witnesses.

CHARLES H. CAMPBELL.

Witnesses:

DOMINGO A. USINA,
THEODORE T. SNELL.